(12) United States Patent
Yamasaki (10) Patent No.: US 8,646,568 B2
(45) Date of Patent: Feb. 11, 2014

(54) ELECTRIC MOTOR ASSEMBLY AND ELECTRIC POWER STEERING DEVICE

(75) Inventor: Masashi Yamasaki, Obu (JP)

(73) Assignee: Denso Corporation, Kariya (JP)

( * ) Notice: Subject to any disclaimer, the term of this patent is extended or adjusted under 35 U.S.C. 154(b) by 6 days.

(21) Appl. No.: 13/337,539

(22) Filed: Dec. 27, 2011

(65) Prior Publication Data

US 2012/0160596 A1    Jun. 28, 2012

(30) Foreign Application Priority Data

Dec. 28, 2010    (JP) ................................ 2010-292292

(51) Int. Cl.
*B62D 5/04*    (2006.01)

(52) U.S. Cl.
USPC .......................................... 180/443; 180/400

(58) Field of Classification Search
USPC ................................................. 180/443, 400
See application file for complete search history.

(56) References Cited

U.S. PATENT DOCUMENTS

| 5,810,111 | A * | 9/1998 | Takeuchi et al. | 180/443 |
| 7,932,651 | B2 * | 4/2011 | Fujimoto et al. | 310/71 |
| 8,304,944 | B2 * | 11/2012 | Sonoda et al. | 310/68 B |
| 8,436,500 | B2 * | 5/2013 | Minato | 310/68 C |
| 2002/0060105 | A1 * | 5/2002 | Tominaga et al. | 180/443 |

FOREIGN PATENT DOCUMENTS

| JP | 60-28459 | 2/1985 |
| JP | 2002-120739 | 4/2002 |
| JP | 2010-132039 | 6/2010 |

OTHER PUBLICATIONS

Office Action issued Jan. 8, 2013 in corresponding Japanese Application No. 2010-292292 with English translation.

* cited by examiner

*Primary Examiner* — J. Allen Shriver, II
*Assistant Examiner* — Conan Duda
(74) *Attorney, Agent, or Firm* — Harness, Dickey & Pierce, PLC (57) ABSTRACT

An electric power steering device includes an electric motor assembly. The assembly includes a case, a motor, and a control unit. The control unit controls the motor based on at least a torque signal indicative of a steering torque applied to a steering wheel by an operator. A power connector is disposed to protrude toward radial outside from the case. A signal connector is disposed to protrude toward radial outside from the case. A torque signal connector is disposed on a case portion close to the control unit to protrude toward radial outside from the case. The torque signal connector and the power connector are disposed apart from each other by a predetermined distance, and the torque signal connector has a connecting portion, which is prepared to be connected with the torque signal line, formed toward the motor along the axial direction of the case.

9 Claims, 11 Drawing Sheets

ELECTRIC MOTOR ASSEMBLY AND ELECTRIC POWER STEERING DEVICE

CROSS REFERENCE TO RELATED APPLICATION

This application is based on Japanese Patent Application No. 2010-292292 filed on Dec. 28, 2010, the contents of which are incorporated herein by reference in its entirety.

FIELD OF THE INVENTION

The present invention relates to an electric motor assembly and an electric power steering device having the motor assembly.

BACKGROUND OF THE INVENTION

JP2002-120739A discloses an electric power steering device (EPS) which assists steering of a driver. The EPS includes an electric motor assembly which outputs an assist torque and has an electric motor and a control unit for controlling the electric motor. In order to make the assembly compact in size and light in weight, the control unit is mounted close to the electric motor.

SUMMARY OF THE INVENTION

The assembly includes a torque signal interface, a power source interface, and a signal interface. Torque signal lines for transmitting a torque signal to the control unit is connected to the torque signal interface. Power source lines for supplying electric power to the electric motor and the control unit is connected to the power source interface. Signal lines are connected to the signal interface. The signal lines transmit vehicular condition signals to the control unit. The signal lines may include a data communication line, such as CAN (Controller Area Network). The torque signal interface is formed as a single unit with power source interface and the signal interface. Accordingly, the unitarily formed interface becomes large in size. Consequently, the electric motor assembly becomes large in size. In addition, an electromagnetic noise of the power source lines may affects the torque signal to lower accuracy.

It is an object of the present invention to provide an electric motor assembly and an electric power steering device which is compact in size and is possible to perform accurate control.

It is another object of the present invention to provide an electric motor assembly and an electric power steering device which is compact in size and has a torque signal interface with sufficient noise immunity.

According to the present invention, an electric motor assembly is provided. The electric motor assembly outputs torque based on a first signal from a sensor. The electric motor assembly includes a case, a motor, a control unit, a power source interface, a first signal interface, and a second signal interface. The case is formed in a cylindrical shape and provides an outer shell. The motor is disposed in the case and is capable of outputting the torque through a shaft. The control unit is disposed on an axial side of the motor and is disposed in the case. The control unit is capable of controlling the motor based on at least the first signal. The power source interface is disposed on the case to protrude in a radial outside direction from the case. The power source interface is prepared to be connected with a power source line for supplying electric power to the motor and the control unit. The first signal interface is disposed on the case to protrude in a radial outside direction from the case. The first signal interface is prepared to be connected with a first signal line for transmitting the first signal to the control unit. The first signal interface is disposed on an axial side of the motor where the control unit is disposed. The second signal interface is disposed on the case to protrude in a radial outside direction from the case. The second signal interface is prepared to be connected with a second signal line for transmitting a second signal for controlling the motor to the control unit. The first signal interface and the power source interface are disposed apart from each other by a predetermined distance. The first signal interface has a connecting portion which is prepared to be connected with the first signal line, and is formed toward the motor along the axial direction of the case.

According to the present invention, an electric power steering device having the electric motor assembly is provided.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

Hereafter, embodiments of the present invention are explained based on the drawings. In the following description, the same or similar components and parts are indicated by the same reference symbols and redundant explanations are omitted.

First Embodiment

A first embodiment is explained with reference to FIGS. 1 to 7. The electric motor assembly 1 of this embodiment is applied to an electric power steering device 9, which may be referenced as EPS 9. The electric motor assembly 1 is disposed close to a steering column 6, which is a component of a steering system for transmitting a steering torque from a steering wheel on a vehicle. The electric motor assembly 1 is meshed with a gear 7 in a gear box provided on the steering column 6 (see FIG. 7). The electric motor assembly 1 generates an assist torque, which assists a steering operation by an operator on the vehicle, and supplies it to the steering column 6. The electric motor assembly 1 may output the assist torque by rotation in either direction based on input signals. The input signal includes a torque signal outputted from a torque sensor (TRS) 8 which detects the steering torque applied to the steering wheel 5, and other signals at least including a speed signal of the vehicle acquired from a data communication system, such as CAN (Controller Area Network), (see FIG. 7).

Figure 1:
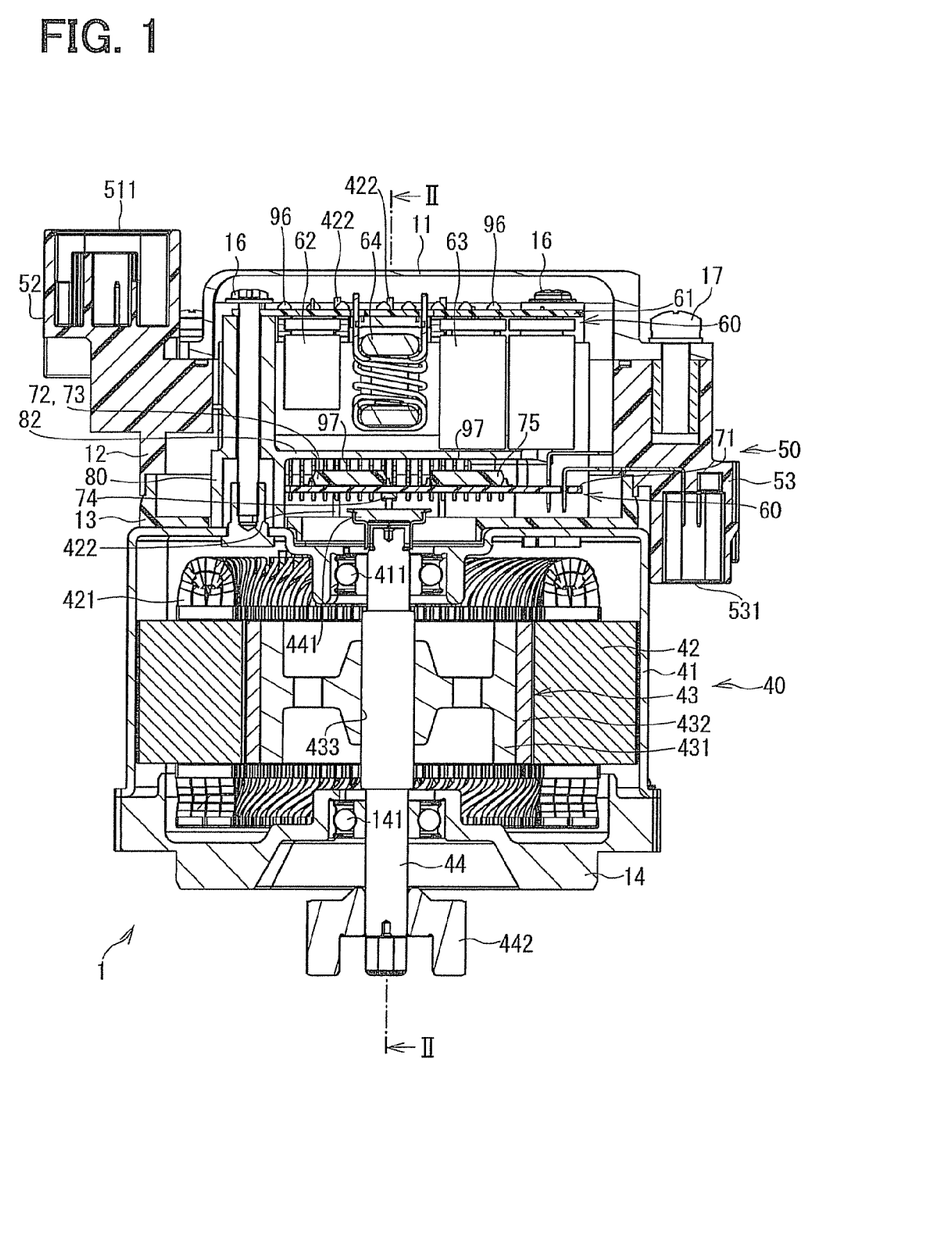
FIG. 1 is cross sectional view of an electric motor assembly according to an embodiment of the present invention.

As shown in FIG. 1, the electric motor assembly 1 includes a motor (MTR) 40 and a controller 50. The controller 50 is disposed on an outside of the motor 40 on one axial end. The motor 40 includes a motor case 41, a stator 42, a rotor 43, and a shaft 44.

The motor case 41 is formed in a cylindrical shape with large opening on one axial end and small opening on the other axial end. A flame end 14 is attached on the motor case 41 to cover the opening on an axial opposite side where the controller 50 is not disposed. The flame end 14 is fixed by fastening members such as screws. The shaft 44 is supported on the motor case 41 and the flame end 14 in a rotatable manner. The shaft 44 is disposed to penetrate a center on the axial side where the controller 50 is disposed. A guide member 13 made of resin is disposed on an outside of the motor case 41 on a side where the controller 50 is disposed. The guide member 13 is formed in an approximately ring shape, and has an opening on a center.

The stator 42 is disposed in a radial inside of the motor case 41. The stator 42 includes a laminated iron core, which is made by laminating a plurality of thin plate made of magnetic material, and a winding 421 wound on the laminated iron core. The winding 421 is arranged to form a poly-phase winding. Motor lines 422 extending from the winding 421 passes through the guide member 13, and reaches to a side where the controller 50 is disposed. Each of the motor lines 422 passes through a radial outside of the control circuit board 71 and the power module 90, and is electrically connected to the power circuit board 61.

The rotor 43 is disposed in a radial inside of the motor case 41 and the stator 42, and is supported to be rotatable relative to the stator 42. The rotor 43 is formed in a cylindrical shape, for example, is made from magnetic material, such as iron. The rotor 43 includes a rotor core 431 and permanent magnets 432 disposed on a radial outside periphery of the rotor core 431. The permanent magnets 432 are arranged to provide the N-poles and the S-poles in an alternating manner along a circumferential direction.

The shaft 44 is fixed to a shaft hole 433 which is formed on a center of the rotor core 431. The shaft 44 is rotatably supported on a bearing 141 disposed on the motor case 41 and a bearing 411 disposed on the flame end 14. Thereby, the shaft 44 is rotatable with the rotor 43 with respect to the stator 42.

The shaft 44 has a magnet generator 441 on an axial end located on the side close to the controller 50. The magnet generator 441 is disposed on a place which exposes to the controller 50, and faces a surface of the control circuit board 71 facing to the motor 40. On the other hand, the shaft 44 has an output end 442 on the end opposite to the controller 50. The output end 442 is rotated when the shaft 44 rotates. The output end 442 is engaged and meshed with the gear 7, and applies driving force to the steering column 6 by rotating the gear 7.

Figure 5:
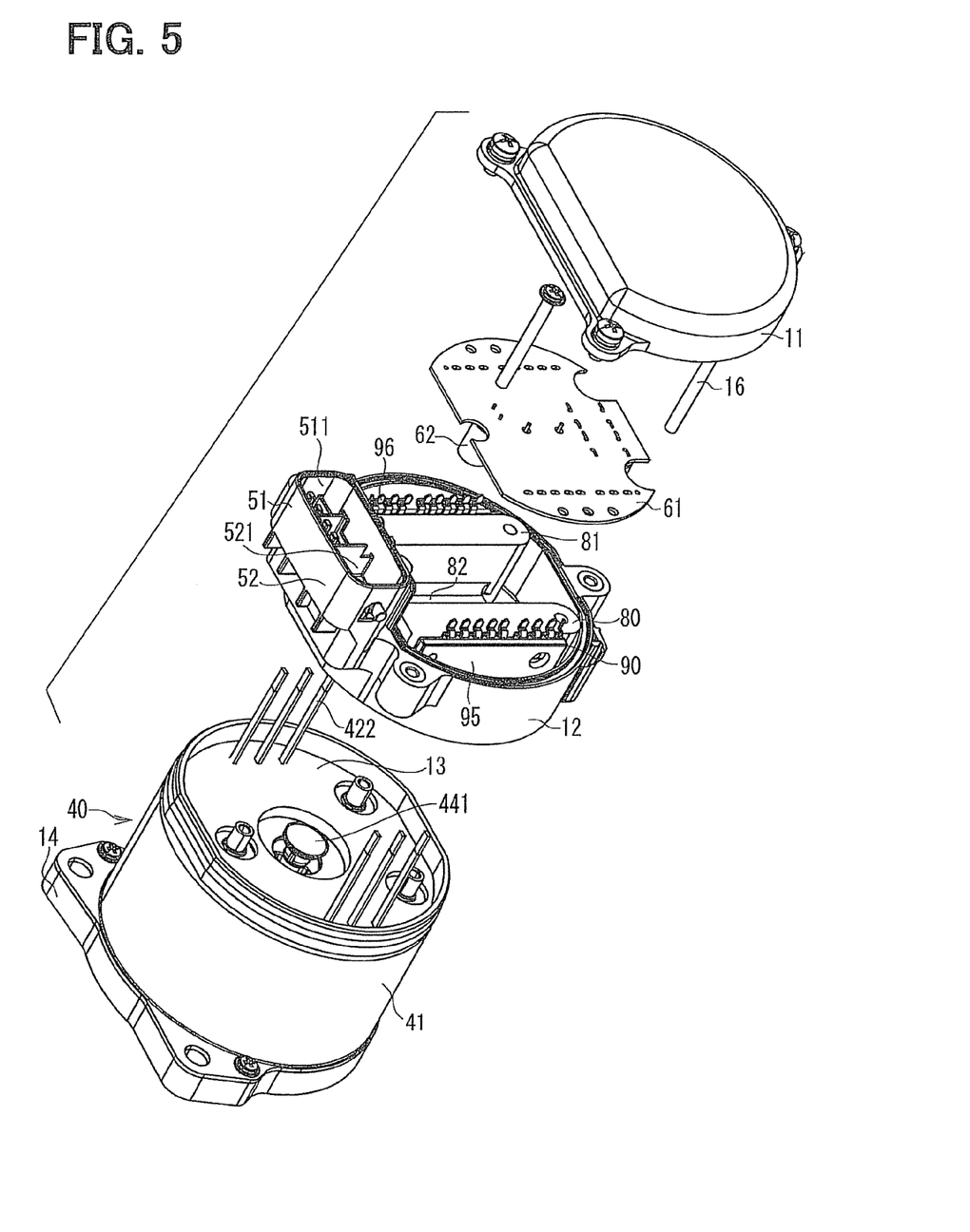
FIG. 5 is an exploded perspective view of the electric motor assembly according to the first embodiment.

The controller 50 is disposed on the motor 40 on a side opposite to the flame end 14 in the axial direction. As shown in FIG. 1 and FIG. 5, the controller 50 includes electronic components, such as a circuit boards 61, 71, electronic devices mounted on the boards 61, 71, a heat sink 80, power modules 90, a power connector 51, a signal connector 52, and a torque signal connector 53. The electronic components, such as the circuit boards 61, 71, the electronic devices mounted on the boards 61, 71, and the power modules 90 provide a control unit. The control unit is disposed on an axial side of the motor 40. The control unit is disposed in a case. The control unit is capable of controlling the motor based on the first signal, i.e., the torque signal.

The power connector 51 provides a power source interface. The torque signal connector 53 provides a first signal interface, i.e., a torque signal interface. The signal connector 52 provides a second signal interface. The power connector 51. is disposed on a case to protrude in a radial outside direction, and is prepared to be connected with a power source line for supplying electric power to the motor 40 and the control unit. The torque signal connector 53 is disposed on the case to protrude in a radial outside direction, and is prepared to be connected with a first signal line for transmitting the first signal to the control unit. The first signal is a principal or fundamental signal that is necessary to control the electric motor assembly 1 for an application. In the EPS, the first signal is a torque signal. The torque signal connector 53 is disposed on a place rather close to the control unit than the motor 40 in the axial direction. The torque signal connector 53 is disposed on a radial outside of a boundary between the motor case 41 and a circuit case made of the members 11, 12, 13. The torque signal connector 53 is on an axial side of the motor 40 where the control unit is disposed. The signal connector 52 is disposed on the case to protrude in a radial outside direction, and is prepared to be connected with a second signal line for transmitting a second signal for controlling the motor 40 to the control unit. The second signal is a signal other than the first signal. The second signal is an additional or auxiliary signal that is preferable to be used to control the electric motor assembly 1 for the application. In the EPS, the second signal may include a speed signal.

The heat sink 80 is formed in a unitary shape, for example, is made of material having good thermal conductivity, such as aluminum. The heat sink 80 has two heat dissipation blocks 81 and a connection part 82 formed between the heat dissipation blocks 81 (see FIG. 2). The heat sink 80 is fixed to the motor case 41 with the screws 16 (see FIG. 5).

Figure 2:
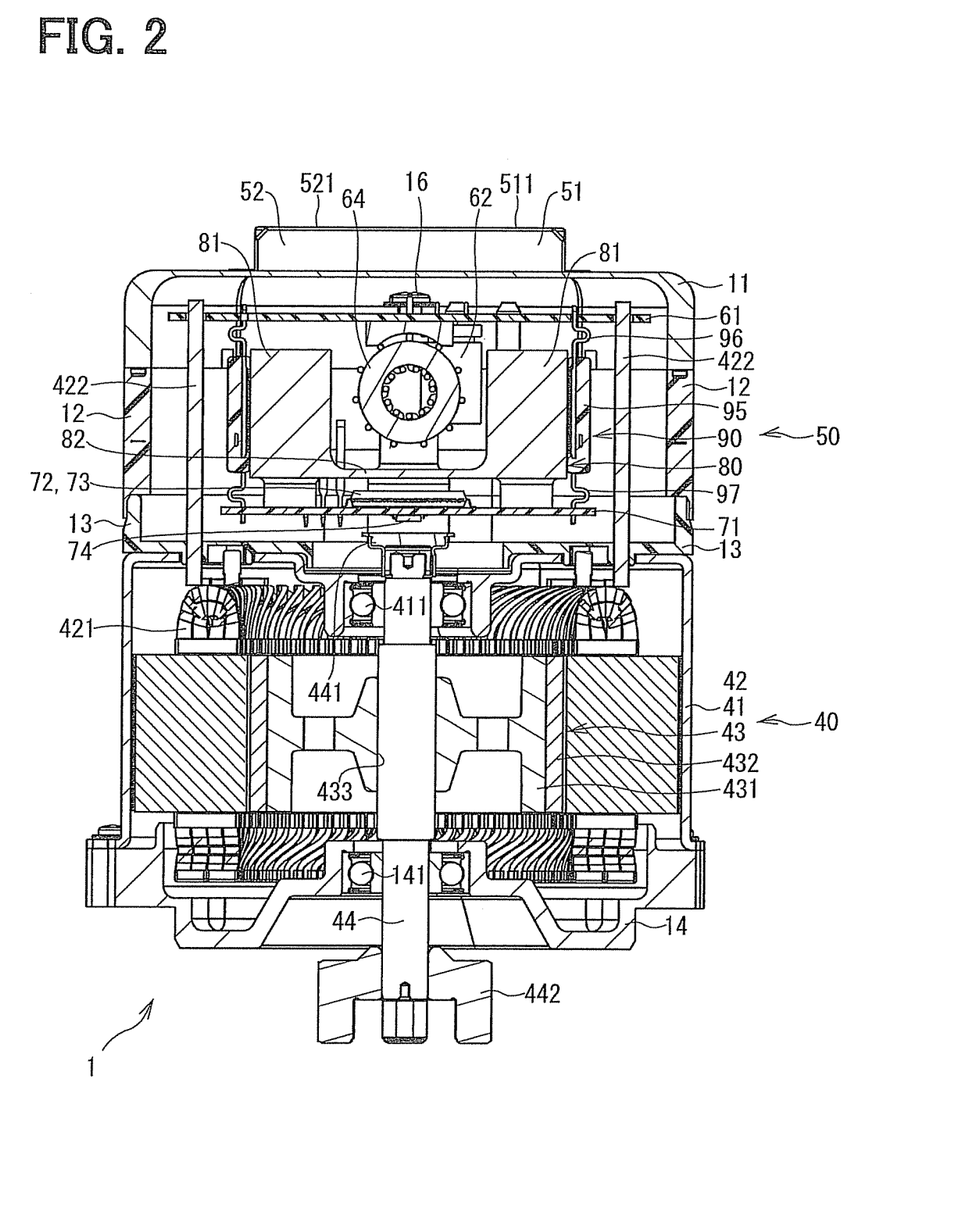
FIG. 2 is a cross sectional view showing a II-II cross section in FIG. 1.

As shown in FIG. 2, the power modules 90 are formed in a flat plate like shape. The power modules 90 are disposed in a vertical fashion with respect to the circuit boards in substantially parallel to the shaft 44. The power modules 90 are disposed on radial outside of the heat dissipation blocks 81, respectively (see FIG. 5). The power module 90 includes electronic devices, such as a semiconductor chip providing the MOS and a shunt resistor 99. The power module 90 is formed by molding the electronic devices by the molding part 95 made of resin. The control unit includes two power modules 90 which provide a pair of inverter circuits 91 and 92, respectively (see FIG. 6). One of the power modules 90 is disposed on one of the heat dissipation blocks 81. Each of the power modules 90 has power terminals 96 projected from one end of the molding part 95, and control terminals 97 projected from the other end of the molding part 95. The control terminals 97 are projected from a side end of the molding part 95 where the control circuit board 71 is disposed, and are electrically connected to the control circuit board 71. The power terminals 96 are projected from a side end of the molding part 95 where the power circuit board 61 is disposed, and are connected to the power circuit board 61.

The control circuit board 71 is a four-layered circuit board, for example, made of glass epoxy boards. The control circuit board 71 is formed in a substantially rectangular shape which can be accommodated within the case. The control circuit board 71 is attached on the heat sink 80 from a side where the motor 40 is disposed by screws.

A microcomputer 72, a pre-driver 73, a position sensing device 74, and a custom IC 75 are mounted on the control circuit board 71. The position sensing device 74 is disposed on a substantial center of the control circuit board 71 to face the magnet generator 441 on the shaft 44. The position sensing device 74 detects a rotational position of the shaft 44 by detecting change of magnetic field which is generated by the magnet generator 441, and is rotated with the shaft 44.

The power circuit board 61 is a four-layered circuit board, for example, made of glass epoxy boards. The power circuit board 61 has thicker conductive layers made of patterned copper foils than the control circuit board 71. The power circuit board 61 is formed in a substantially rectangular shape, e.g., a square shape, which can be accommodated within the case. One first smoothing capacitor 62, four second smoothing capacitors 63, and a choke coil 64 are mounted on the power circuit board 61. The motor lines 422 are electrically connected to the power circuit board 61 by connecting method, such as soldering etc.

The first smoothing capacitor 62, the second smoothing capacitor 63, and the choke coil 64 are disposed in a location formed between two heat dissipation blocks 81 of the heat sink 80. These large-sized electronic devices are mounted on the end face of the power circuit board 61 on a side where the motor 40 is disposed. In this embodiment, a cylindrical member 12 is disposed on the motor 40 on an opposite side to the flame end 14 with respect to an axial direction. The cylindrical member 12 is formed in a cylindrical shape, and, for example, is formed of resin. A cover 11 is disposed on the cylindrical member 12 on an opposite side to the motor 40 with respect to the axial direction. The cover 11 is attached to the cylindrical member 12 by screws 17. The cover 11, the cylindrical member 12, the guide member 13, and the motor case 41 form a cylindrical container. The cylindrical container accommodates the electronic components, such as the circuit boards 61 and 71, the electronic devices mounted on the boards 61 and 71, and the power modules 90, etc. The cover 11, the cylindrical member 12, the guide member 13, the motor case 41, and the flame end 14 form and provide a case for the electric motor assembly 1. The case is a generally cylindrical container defining two partially or completely separated cavities. The cavities are axially arranged along an axial direction of the case in a tandem manner. One of the cavities provides a room for the motor 40. The other one of the cavities provides a room for the electronic circuit components. The motor case 41 defines an axis that corresponds to a rotational axis of the motor 40. The axis of the motor case 41 may also be referred to as an axis of the case for the electric motor assembly 1.

The power connector 51, the signal connector 52, and the torque signal connector 53 are formed on a radial outside of the cylindrical member 12. The power connector 51, the signal connector 52, and the torque signal connector 53 are unitarily formed with the cylindrical member 12 into a unitary member. The signal connector 52 and the power connector 51 are unitarily formed into a single integral connector. The torque signal connector 53 and the power connector 51 are disposed apart from each other by a predetermined distance. The torque signal connector 53 and the power connector 51 provide a point symmetry arrangement with respect to a predetermined point on an axis of the motor case 41.

The power connector 51 has a connecting portion 511 which is prepared to be connected with the power source line 510. The power connector 51 supplies electric power from the power source 100 to the motor 40, a power part 60, and a control part 70 (see FIG. 6).

Figure 3:
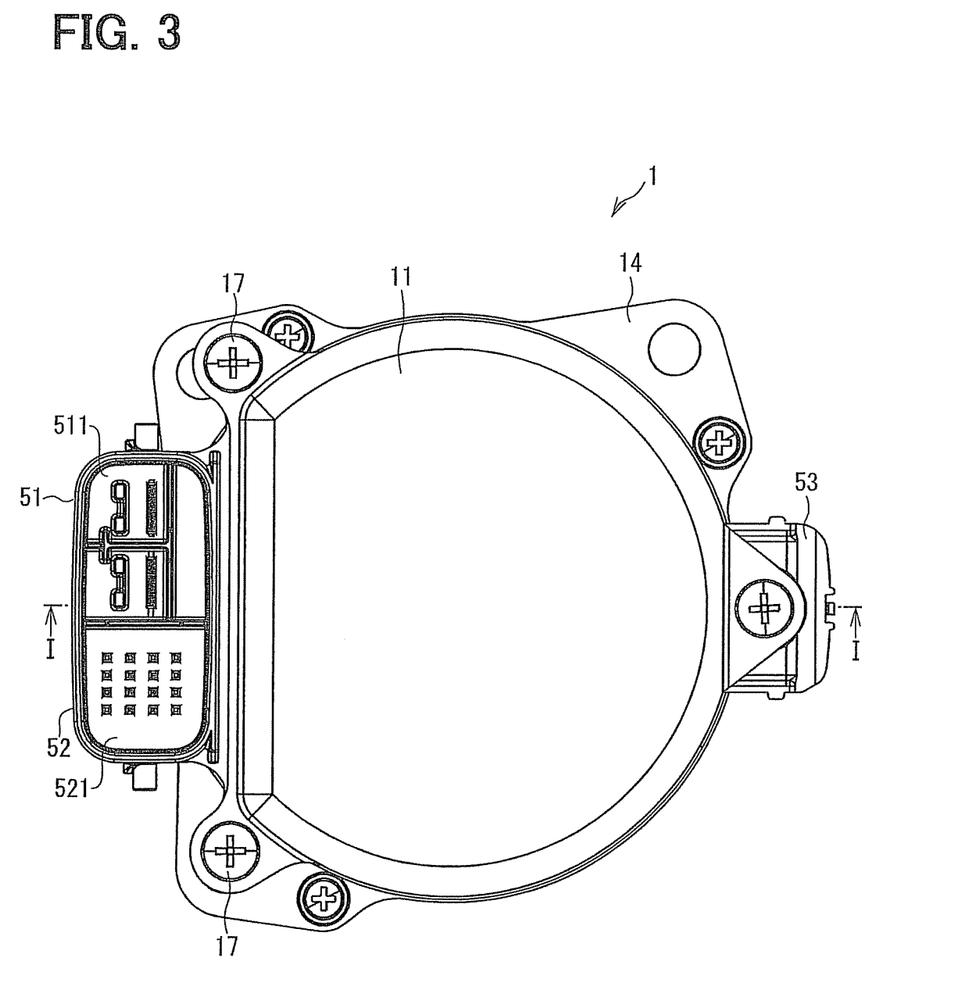
FIG. 3 is a plan view of the electric motor assembly according to the first embodiment.
Figure 4:
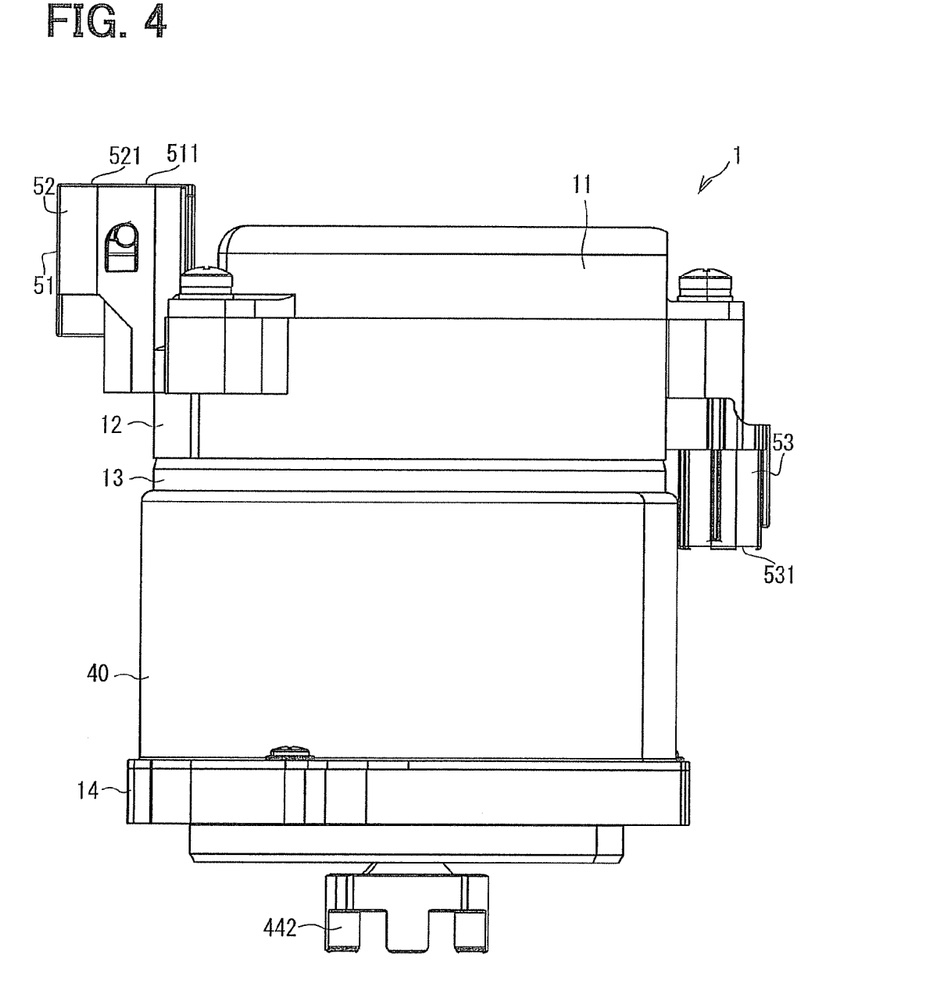
FIG. 4 is a side view of the electric motor assembly according to the first embodiment.

The signal connector 52 has a connecting portion 521 which is prepared to be connected with the signal line 520. The signal connector 52 supplies signals, such as a speed signal etc. to the control part 70 (see FIG. 6). FIG. 3 and FIG. 4 show opening and extending directions of the connecting portions 511 and 521. The power connector 51 is formed to direct the connecting portion 511 in the axial direction of the case. The power connector 51 is formed to direct the connecting portion 511 toward an axial side where the motor 40 is not disposed. In other words, the power connector 51 is formed so that the connecting portion 511. is directed toward an opposite side to the motor 40 along the axial direction of the case. The signal connector 52 is formed to direct the connecting portion 521 toward an axial side where the motor 40 is not disposed. In other words, the signal connector 52 is formed so that the connecting portion 521 is directed toward an opposite side to the motor 40 along the axial direction of the case. Both the connecting portion 511 and the connecting portion 521 are formed toward an axial back side where the cover 11 is disposed on the electric motor assembly 1. On the other hand, the connecting portion 531 is formed toward an axial frontal side where the output end 442 is disposed on the electric motor assembly 1.

The torque signal connector 53 has a connecting portion 531, which is prepared to be connected with a torque signal line 530. The torque signal connector 53 supplies a torque signal detected and outputted from the torque sensor 8 through the connecting portion 531 to the control section 70 (see FIG. 6). As shown in FIG. 3 and FIG. 4, the torque signal connector 53 is formed so that the connecting portion 531 is directed toward an axial side where the motor 40 is disposed along the axial direction of the case. In other words, the torque signal connector 53 has the connecting portion 531 which is prepared to be connected with the torque signal line, and is formed toward the motor 40 along the axial direction of the case.

Figure 6:
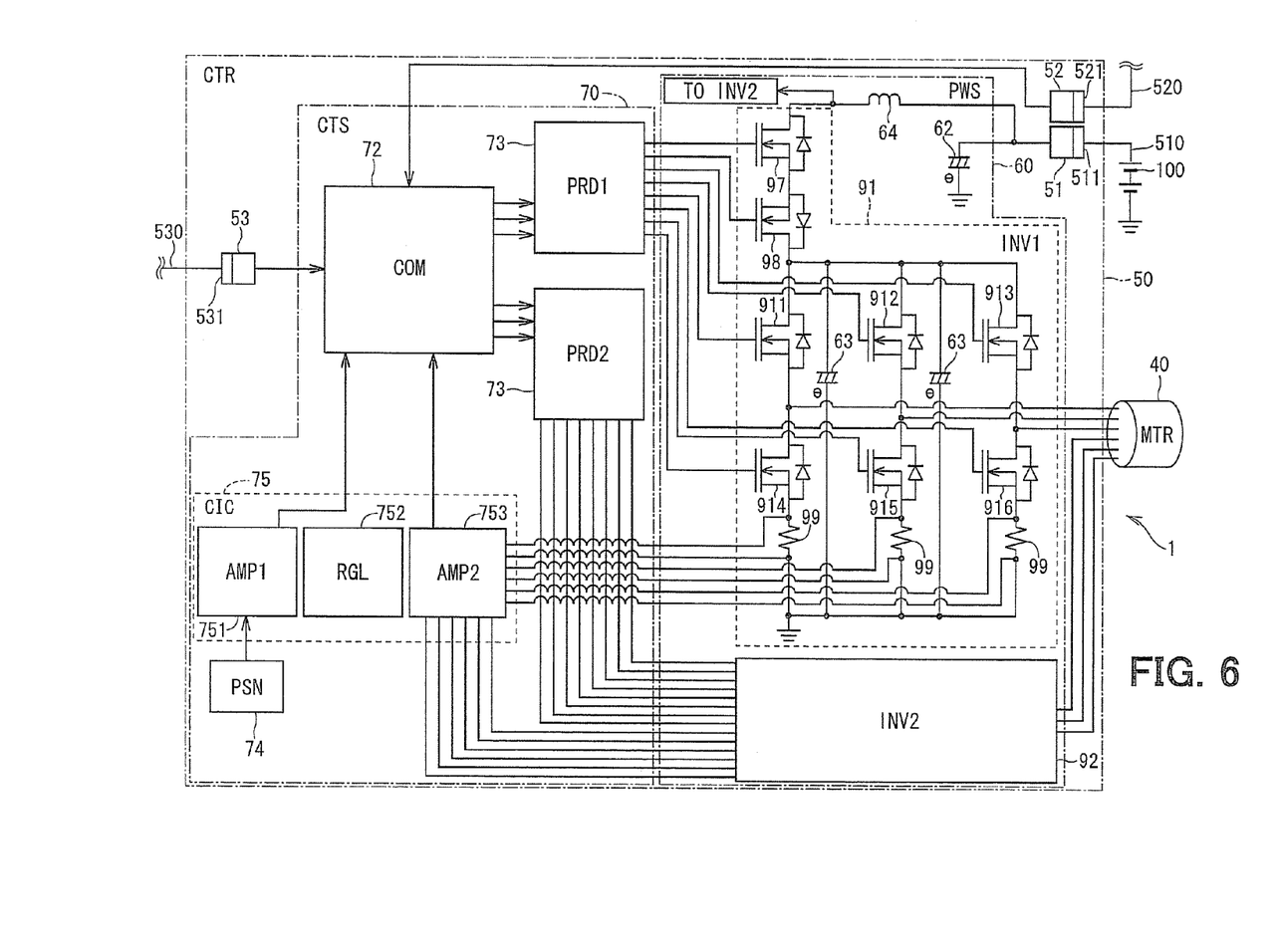
FIG. 6 is a circuit diagram showing a circuit in the electric motor assembly according to the first embodiment.

Next, the arrangement of the electric motor assembly 1 of this embodiment is explained based on FIG. 6. As shown in FIG. 6, the electric motor assembly 1 includes the motor (MTR) 40 and the controller 50. The motor 40 is a brushless motor. The controller 50 controls driving of the motor 40 and current supply to the motor 40.

The controller 50 includes the power part 60 for supplying large current to the motor 40, the control part 70 for controlling the power part 60, the power connector 51, the signal connector 52, and the torque signal connector 53. The power part (PWS) 60 and the control part (CTS) 70 provide the control unit.

The power part 60 includes a first smoothing capacitor 62, a choke coil 64, and two inverter circuits 91 and 92. The power part 60 includes the first inverter circuit (INV1) 91 and the second inverter circuit (INV2) 92. The first smoothing capacitor 62 and the choke coil 64 forms a filter circuit which reduces noise transmitted from other devices sharing the power source 100. The filter circuit also reduces noise transmitted from the electric motor assembly 1 to other devices sharing the power source 100. The choke coil 64 is inserted in a connecting line between the power source 100 and the power relays 97, 98 to suppress fluctuation of power supply.

The first inverter circuit 91 includes a plurality of switching devices. The switching device may be provided by a MOSFET (Metal-Oxide-Semiconductor Field-Effect Transistor) 911-916 which is a kind of a field effect transistor. The MOS- FET may be referred to as a MOS. The MOS 911-916 turns on and off electric conduction between a source and a drain in response to a gate potential.

The MOS 911, 912, 913 provide upper arms. The MOS 914, 915, 916 provide lower arms. Each of the drains of the MOS 911, 912, 913 is connected to a power source line. Each of the sources of the MOS 911, 912, 913 is connected to corresponding one of the drains of the MOS 914, 915, 916. Each of the sources of the MOS 914, 915, 916 is connected to a ground line. Each of the connecting portions between corresponding pair of the MOS 911, 912, 913 and the MOS 914, 915, 916 is connected to the motor 40. The other inverter circuit 92 has an arrangement that is similar to the inverter circuit 91 described above.

The power part 60 includes power relays 97 and 98 corresponding to the inverter circuits 91 and 92, respectively. The power relays 97 and 98 are provided by using the MOSFET as well as the MOS 911-916. The power relays 97 and 98 are disposed between the MOS 911-913 and the choke coil 64. The power relays 97 and 98 can turn off current flowing the motor 40 via the MOS 911-916 in an abnormal condition.

The shunt resistor 99 is electrically connected between the MOS 914-916 and the ground. The control unit detects current flowing through the motor 40 by detecting the voltage or current on the shunt resistor 99.

The second smoothing capacitor 63 is connected between the power source line of the MOS 911-913 and the ground line of the MOS 914-916. That is, the second smoothing capacitor 63 is connected in parallel to a bridge circuit of the MOS 911-916. The second smoothing capacitor 63 assists electric power supply to the MOS 911-916, and absorbs ripple current caused by a current switching operation, by changing and discharging electric charge.

The control part 70 includes the pre-drivers (PRD1, PRD2) 73, the custom IC (CIC) 75, the position sensing device (PSN) 74, and the microcomputer (COM) 72. The custom IC 75 includes functional blocks, such as a position signal amplifier (AMP1) 751, a regulator part (RGL) 752, and a voltage amplifier (AMP2) 753.

The regulator part 752 is a voltage regulator circuit for stabilizing voltage supplied from the power source and supplies the stabilized voltage to circuits in the control unit. For example, the microcomputer 72 can perform by a predetermined stabilized voltage, e.g., 5V supplied from the regulator part 752. The position signal amplifier 751 inputs signal from the position sensing device 74. The position sensing device 74 generates and outputs a rotational position signal of the motor 40. The rotational position signal is transmitted to the position signal amplifier 751. The position signal amplifier 751 amplifies the rotational position signal, and outputs it to the microcomputer 72. The voltage amplifier 753 detects a voltage between the ends of the shunt resistor 99, amplifies the voltage, and outputs it to the microcomputer 72.

The microcomputer 72 inputs information, such as a rotation position signal of the motor 40, the voltage between the ends of the shunt resistor 99, the torque signal from the torque signal connector 53, and the speed signal from the signal connector 52, etc. The microcomputer 72 controls the inverter circuit 91 via the pre-drivers 73 according to the rotational position signal in response to the signals inputted. In detail, the microcomputer 72 controls the inverter circuit 91, by changing the gate voltage of six MOS 911-916 by the pre-driver 73 to switch the MOS 911-916 between ON and OFF.

The microcomputer 72 controls the inverter circuit 91 to adjust the current supplied to the motor 40 close to a sinusoidal wave based on the voltage on the shunt resistor 99 inputted from the voltage amplifier 753. In addition, the microcomputer 72 controls the inverter circuit 92 as well as the inverter circuit 91.

Operation of the electric motor assembly 1 is described in detail. The microcomputer 72 controls the pre-drivers 73 to generate pulse signals by the PWM control method. The microcomputer 72 controls the motor 40 to output assist torque that is adjusted according to input signals, such as signals from the position sensing device 74, the torque sensor 8, the shunt resistor 99, and the signal connector 52. The microcomputer 72 controls the motor 40 to output assist torque that is adjusted according to the torque signal from the torque sensor 8. The assist torque is also adjusted according to the speed signal in addition to the torque signal. The assist torque is also adjusted based on the other signals inputted to the microcomputer 72.

The power modules 90 provide two systems of inverter circuits. Therefore, the control unit 60, 70 includes two systems of inverter circuits which supply driving electric power to the motor. The pulse signal is outputted to the power modules 90 via the control terminal 64, and is used to control ON/OFF switching operations of the MOS devices in the power modules 90. As a result, the phase windings on the winding 421 are supplied with sinusoidal-wave currents of which phases are shifted, and generate a rotating magnetic field. The rotor 43 and the shaft 44 are rotated in response to the rotating magnetic field applied to the rotor 43. The electric motor assembly 1 assists steering work on the steering wheel 5 by the operator by outputting driving force to the gear 7 on the steering column 6 through the output end 442 by rotation of the output end 442.

Advantages of the electric motor assembly 1 are explained. The power connector 51, the signal connector 52, and the torque signal connector 53 are formed on radial outside of the electric motor assembly 1. Thereby, it is possible to make the electric motor assembly 1 small in size, especially in axial direction. The power connector 51, the signal connector 52, and the torque signal connector 53 are formed in a coupler shape that merely allows to joint lines in a limited direction to which the connectors 51, 52, 53 are directed. The power connector 51 and the signal connector 52 are directed to a rear side opposite to the end where the output end 442 is located. The torque signal connector 53 is directed to a front side where the output end 442 is located. The torque signal connector 53 is located on a surface of the case, and is formed to open along the axial direction of the case. The power connector 51 and the signal connector 52 are unitarily formed in a connector that is larger in size than the torque signal connector 53 that is separately located from the unitarily formed connector in a circumferential direction. The power connector 51 and the signal connector 52 defines an opening that opens outwardly from the case.

In this embodiment, since the torque signal connector 53 is apart from the power connector 51, it is possible to suppress the influence from the electromagnetic noise on the power source lines to the torque signal. Therefore, it is possible to perform an accurate control of the electric motor assembly 1. In addition, it is possible to perform an accurate control of the electric power steering device 9.

Figure 7:
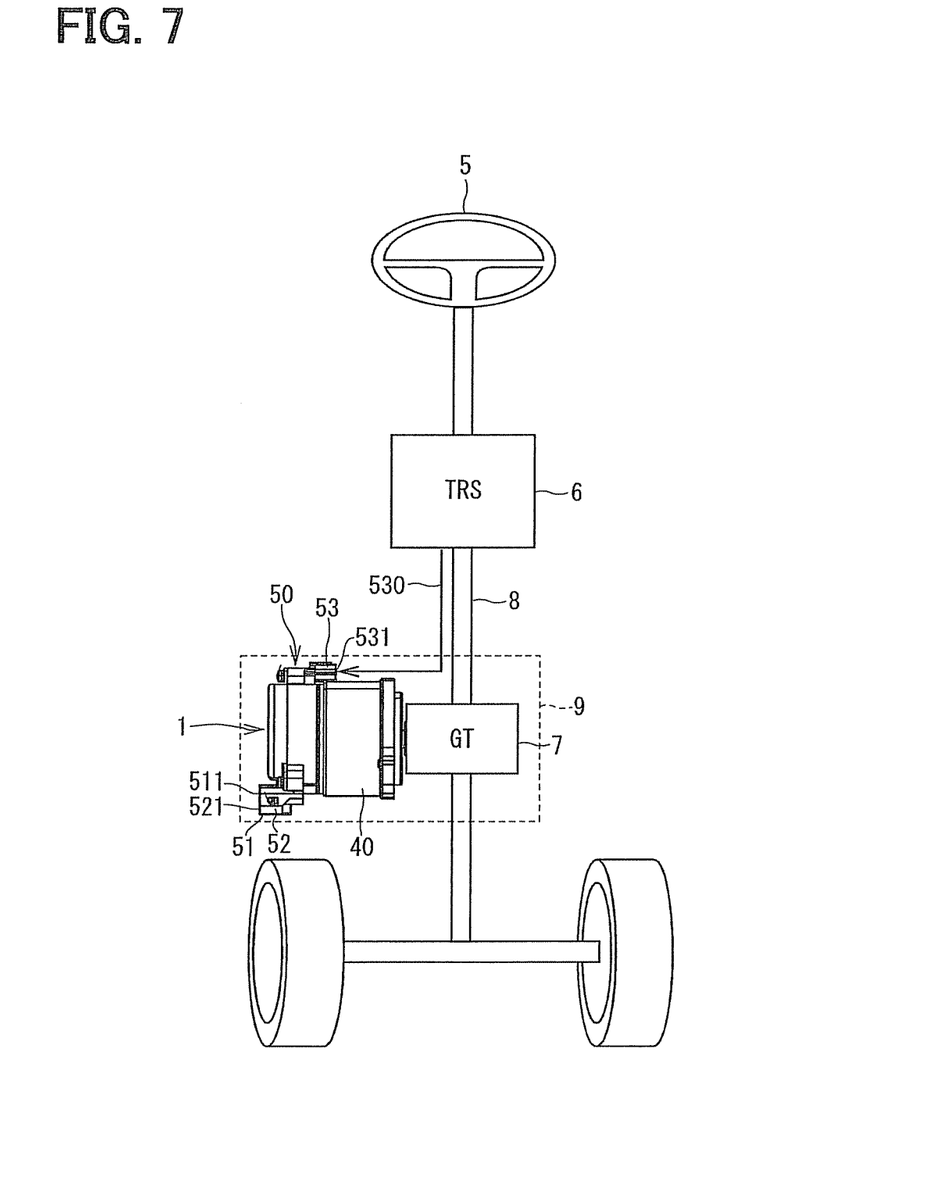
FIG. 7 is a block diagram showing an electric power steering device having the electric motor assembly according to the first embodiment.

The torque signal connector 53 is formed to direct the connecting portion 531 toward an axial side where the motor 40 is disposed. In other words, the torque signal connector 53 is formed so that the connecting portion 531 is directed toward the motor 40 along the axial direction of the case. For this reason, the torque signal line 530 can be arranged along the outer wall of the motor 40, and the steering column 6 as shown in FIG. 7. Therefore, it is possible to avoid interference among the torque signal line 530 and other components.

In this embodiment, the power connector 51 and the signal connector 52 are formed into a unitary shape. The power connector 51 and the signal connector 52 are provided in a single connector that is capable of being connected with a corresponding connector by a single coupling action. It is possible to make the assembly small in size. In addition, this arrangement enables to simplify a manufacturing process of the assembly 1. It is also possible to reduce manufacturing cost. According to the arrangement, both a connecting work for the power source line 510 and the power connector 51 and a connecting work for the signal line 520 and the signal connector 52 can be furnished by a single action. It is possible to reduce the connecting steps and shorten a connecting work time. In this embodiment, the speed signal is stronger than the torque signal in strength of signal. For example, the torque signal varies in a range of 0-200 mV. The speed signal varies in a range of 0-5 V. Therefore, the torque signal is more sensitive to an electromagnetic noise on the power source line than the speed signal. In other words, the speed signal is less influential and more robust to the electromagnetic noise on the power source line than the torque signal. Therefore, the above-mentioned advantages can be achieved by making the power connector 51 and the signal connector 52 into the unitary shape.

In this embodiment, the torque signal connector 53 and the power connector 51 provide a point symmetry arrangement with respect to a predetermined point on the axis of the motor case 41. Therefore, a distance between the torque signal connector 53 and the power connector 51 can be enlarged as much as possible. As a result, it is possible to improve suppression effect which suppresses influence of the electromagnetic noise on the power source lines to the torque signal. In addition, since the torque signal connector 53 and the power connector 51 are arranged on symmetric locations on the case, this arrangement allows disposing the power part 60 and the control part 70 on a location between the torque signal connector 53 and the power connector 51. Thereby, it is possible to shorten wirings, such as wirings from the power connector 51 to the power part 60 and the control part 70, and wirings from the torque signal connector 53 to the control part 79, as short as possible. As a result, it is possible to reduce weight and cost for those wirings.

In this embodiment, it has the two power modules 90 which provide a pair of inverter circuits 91 and 92. Therefore, the components for the controller 3 may be disposed in a location between two power modules 90. It is possible to provide a compact arrangement for those components and to use the space between the modules 90 effectively.

Second Embodiment

Figure 8:
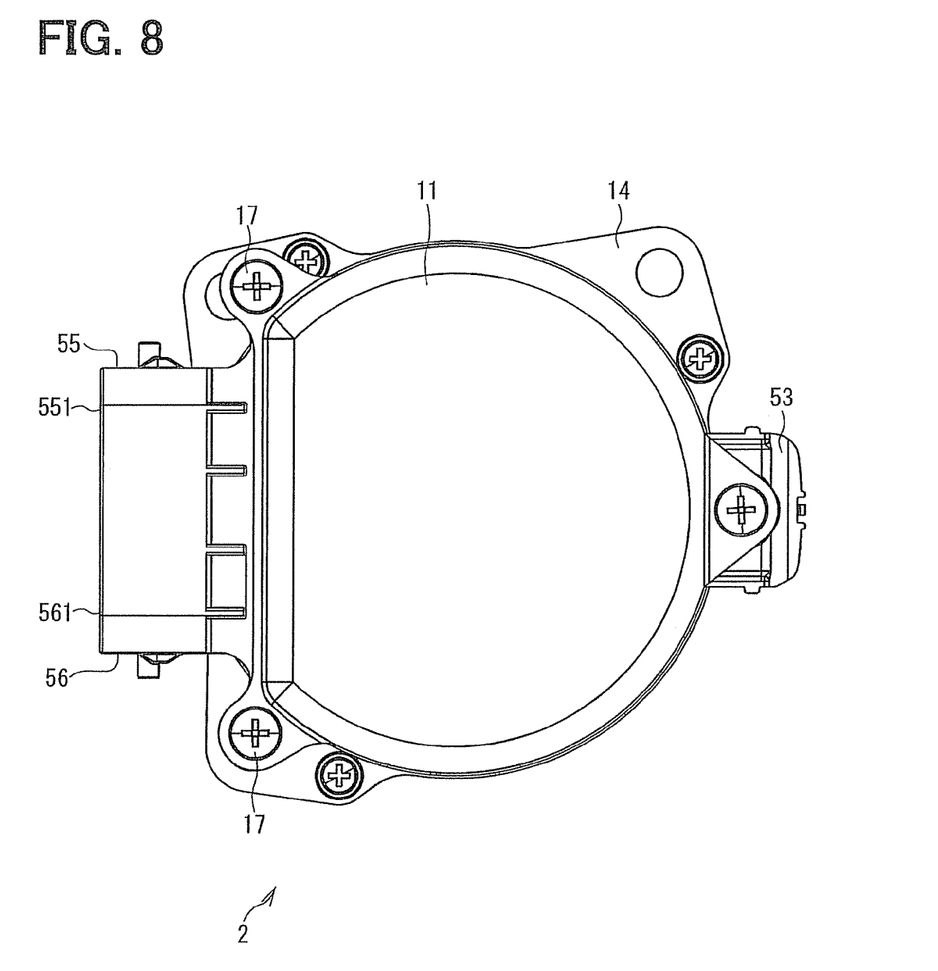
FIG. 8 is a plan view of an electric motor assembly according to a second embodiment of the present invention.
Figure 9:
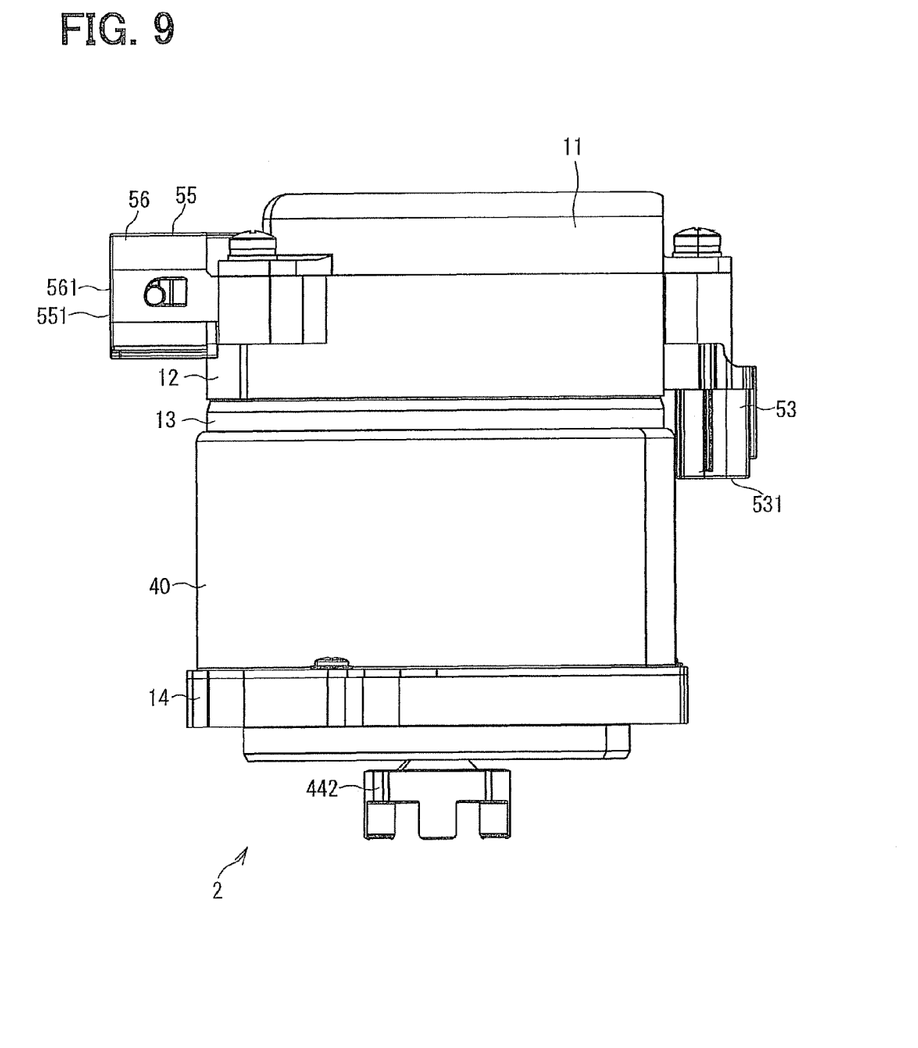
FIG. 9 is a side view of the electric motor assembly according to the second embodiment.

FIG. 8 and FIG. 9 show a second embodiment. A power connector 55 provided as the power source interface has a connecting portion 551 which is prepared to be connected with the power source line. The connecting portion 551 is formed toward radial outside from the case. A signal connector 56 provided as the second signal interface has a connecting portion 561 which is prepared to be connected with the second signal line. The connecting portion 561 is formed toward radial outside from the case, i.e., the cylindrical member 12. In this embodiment, the connecting portion 551 of the power connector 55 and the connecting portion 561 of the signal connector 56 are formed toward the radial outside direction from the case, i.e., the cylindrical member 12. It is possible to form the electric motor assembly 2 small in size.

Third Embodiment

Figure 10:
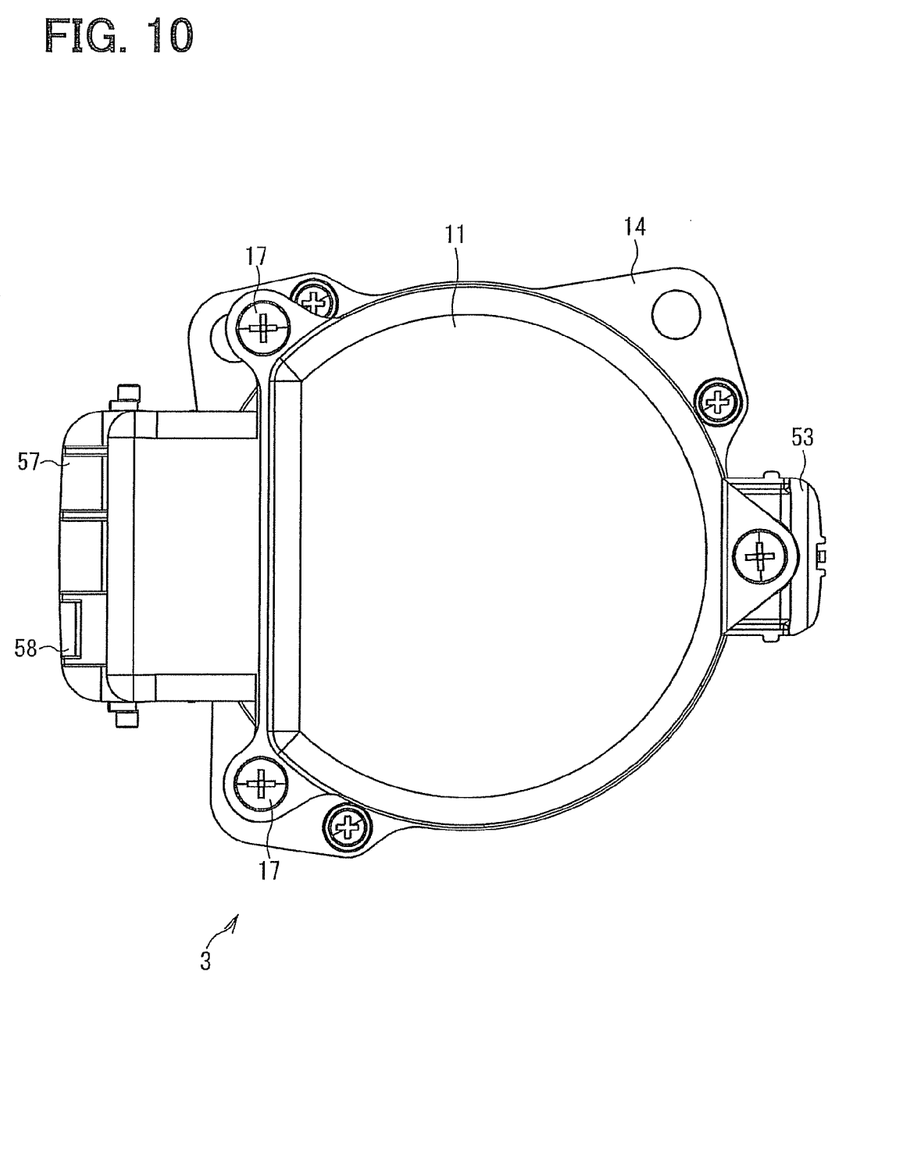
FIG. 10 is a plan view of an electric motor assembly according to a third embodiment of the present invention.
Figure 11:
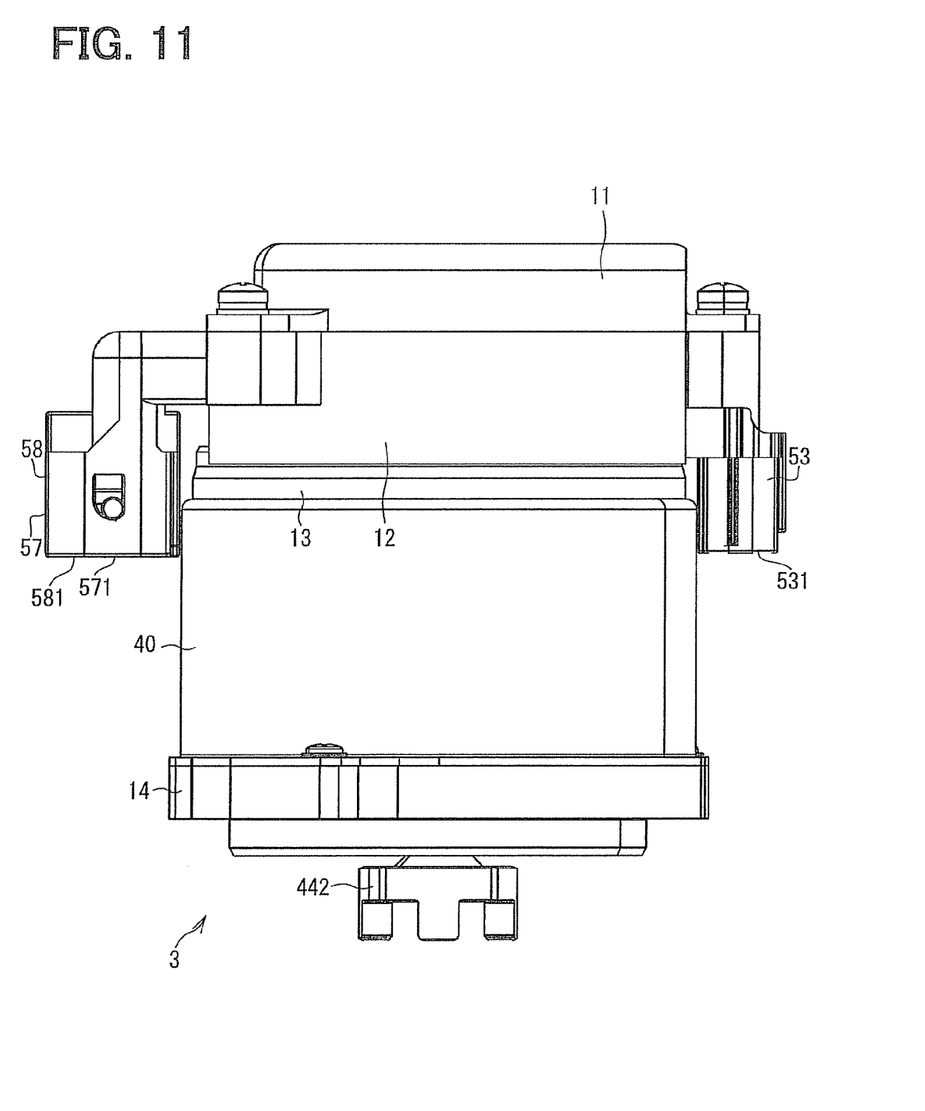
FIG. 11 is a side view of the electric motor assembly according to the third embodiment.

FIG. 10 and FIG. 11 show a third embodiment. A power connector 57 provided as the power source interface has a connecting portion 571 which is prepared to be connected with the power source line. The connecting portion 571 is formed toward the motor 40 in the axial direction. A signal connector 58 provided as the second signal interface has a connecting portion 581 which is prepared to be connected with the second signal line. The connecting portion 581 is formed toward the motor 40 in the axial direction. In this embodiment, an axial size of the electric motor assembly 3 is formed smaller than that of the first embodiment. A radial size of the electric motor assembly 3 is formed smaller than that of the second embodiment. Therefore, it is possible to make the electric motor assembly 3 even smaller in size.

Other Embodiments

In the above described embodiments, the controller is disposed on the other side end to the gear box on the motor. Alternatively, the controller may be disposed between the motor and the gear box. In this case, the shaft of the motor is arranged to penetrate electric circuit boards for the control components and the power components, and to pass through a cavity formed between the heat sinks facing each other. The shaft extends from the motor to the gear box through the controller.

In the above described embodiments, the control unit 60, 70 includes two systems of inverter circuits which supply driving electric power to the motor 40. However, the present invention may be applied to a device that drives the motor by a single inverter circuit or three or more inverter circuits.

In the above described embodiments, the power connector and the signal connector are unitarily formed to provide a connector module. Alternatively, the power connector and the signal connector may be arranged in a separated manner.

In the above described embodiments, the torque signal connector and the power connector provide a point symmetry arrangement with respect to a predetermined point on an axis of the case. However, locations of the torque signal connector and the power connector may be variable. The torque signal connector and the power connector may be disposed on anywhere on circumferential portion of the cylindrical member 12 for the case.

The above described embodiments provide the first and second smoothing capacitors by aluminum electrolytic capacitors. The present invention may be applied to a device which uses various kinds of capacitors, such as a film capacitor. In addition, the terminals of the capacitor and the power module may be directly connected.

In the above described embodiments, the electric motor assembly is used for the EPS. Alternatively, the electric motor assembly may be used for other devices, which uses a motor as a driving power source.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An electric motor assembly which outputs torque based on a first signal from a sensor, the electric motor assembly comprising:
   a case which is formed in a cylindrical shape and provides an outer shell;
   a motor which is disposed in the case and is capable of outputting the torque through a shaft;
   a control unit which is disposed on an axial side of the motor and is disposed in the case, the control unit being capable of controlling the motor based on at least the first signal;
   a power source interface which is disposed on the case to protrude in a radial outside direction, and is connected with a power source line for supplying electric power to the motor and the control unit;
   a first signal interface which is disposed on the case to protrude in a radial outside direction, and is connected with a first signal line for transmitting the first signal to the control unit, the first signal interface being disposed on an axial side of the motor where the control unit is disposed; and
   a second signal interface which is disposed on the case to protrude in a radial outside direction, and is connected with a second signal line for transmitting a second signal for controlling the motor to the control unit, wherein
   the electric motor assembly is adapted to mesh with a gear in a gear box provided on a steering column, which is a component of a steering system for transmitting a steering torque from a steering wheel on a vehicle;
   the electric motor assembly is adapted to output assist torque to the steering column via the gear box based on the first signal, which is a torque signal from a torque sensor disposed on the steering column between the steering wheel and the gear box, the torque sensor being configured to detect the steering torque applied to the steering wheel by an operator of the vehicle as the torque signal;
   the first signal interface and the power source interface are disposed apart from each other by a predetermined distance;
   the first signal interface has a connecting portion which is connected with a torque signal line extending from the torque sensor along the steering column, and extends toward the motor and the steering column along an axial direction of the case; and
   the power source interface has a connecting portion which is connected with the power source line, and extends in the axial direction of the case.

2. The electric motor assembly in claim 1, wherein the second signal interface and the power source interface are unitarily formed.

3. The electric motor assembly in claim 1, wherein the power source interface has a connecting portion which is connected with the power source line, and is formed to protrude in a radial outside direction from the case.

4. The electric motor assembly in claim 1, wherein the first signal interface and the power source interface provide a point symmetry arrangement with respect to a predetermined point on an axis of the case.

5. The electric motor assembly in claim 1, wherein the control unit includes two systems of inverter circuits which supply driving electric power to the motor.

6. The electric motor assembly in claim 1, wherein the motor includes:
   a stator which is disposed in a radial inside of the case and has a winding arranged to form a poly-phase winding; and
   a rotor which is disposed in a radial inside of the case and is supported to be rotatable relative to the stator, wherein
   the shaft is disposed on a center of the rotor and is rotatable with the rotor, and wherein
   the motor is capable of outputting the assist torque through the shaft by rotating the rotor.

7. An electric power steering device, comprising:
   the electric motor assembly claimed in claim 1, wherein
   the torque sensor detects a steering torque applied by an operator of a vehicle as the input torque.

8. The electric power steering device in claim 7, wherein the electric motor assembly is disposed close to a steering column and supplies the assist torque to the steering column.

9. The electric motor assembly in claim 1, wherein the connection portion of the first signal interface is open in a direction toward an output end of the electric motor which meshes with the gear in the gear box provided on the steering column.

* * * * *